Aug. 7, 1951   M. MÅRTENSSON   2,563,655
WOOD SHAPING MACHINE
Filed June 17, 1949   2 Sheets-Sheet 1
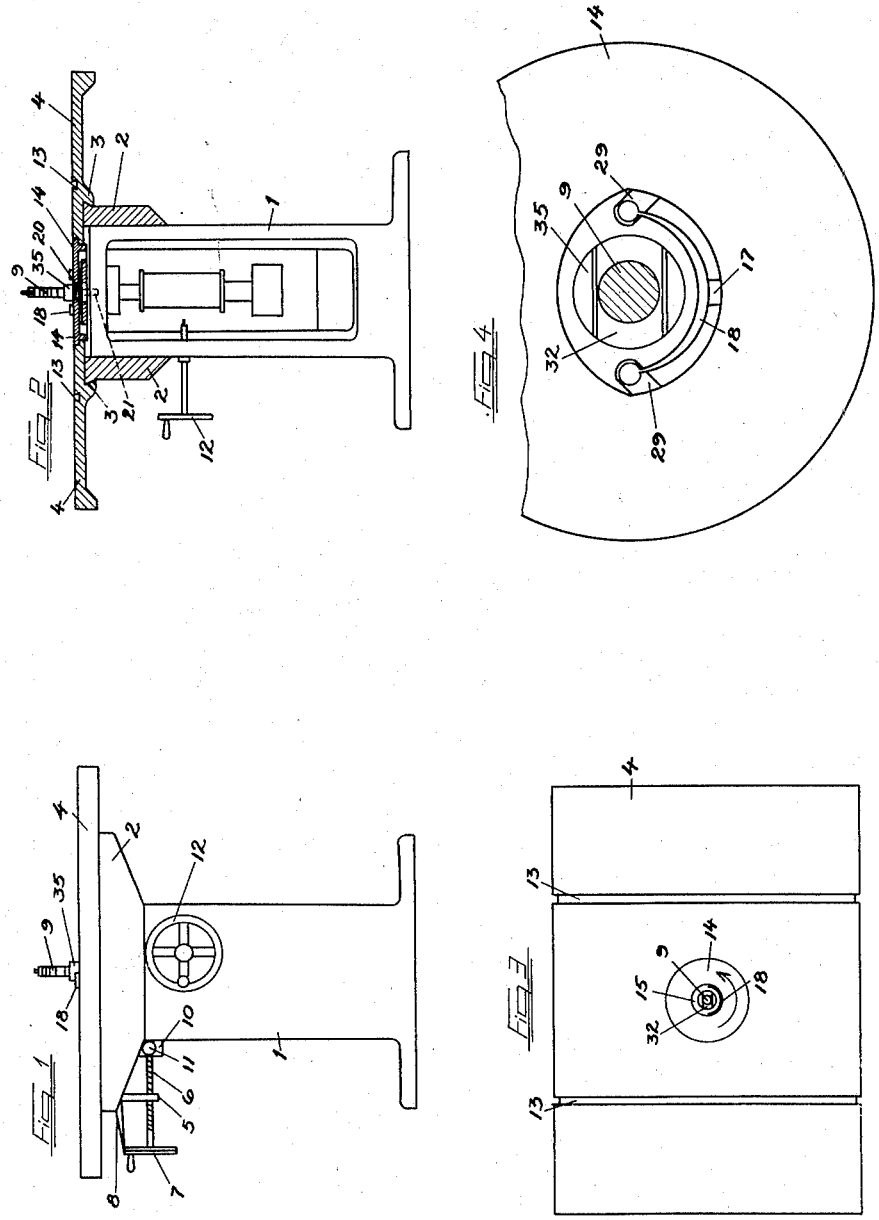
INVENTOR
Martin Mårtensson
BY
Howard P. King
ATTORNEY Aug. 7, 1951    M. MÅRTENSSON    2,563,655
WOOD SHAPING MACHINE
Filed June 17, 1949    2 Sheets-Sheet 2
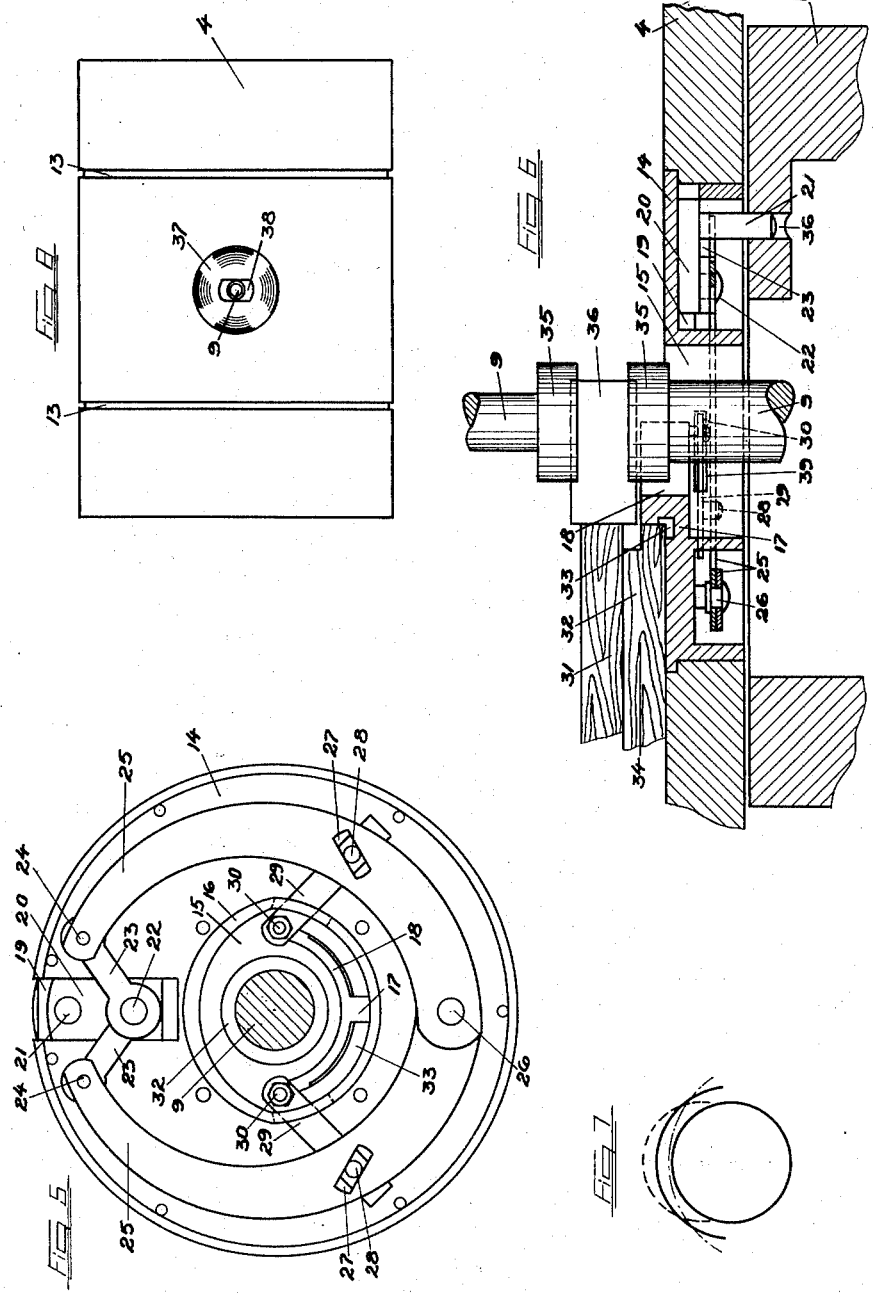
INVENTOR
Martin Martensson
BY
Howard P. King
ATTORNEY Patented Aug. 7, 1951

2,563,655

UNITED STATES PATENT OFFICE 2,563,655

WOOD SHAPING MACHINE

Martin Mårtensson, Emmaljunga, Sweden

Application June 17, 1949, Serial No. 99,671
In Sweden May 29, 1948

4 Claims. (Cl. 144—129)

The present invention relates to a wood shaping machine, in which the desired milling depth or the correct size of the workpiece on milling with a pattern is attained by means of a simple manual operation.

In the already known constructions of guiding collars for wood shaping machines the size of the piece of work is controlled by adjustment of the cutter blades in the gripping jaws of the machine. If a particular precision of the size of the workpiece is desired, this adjustment is a very tedious work, since each cutter blade must have the same milling depth. On milling with a pattern cutter blades of the same form often are used, but on change of pattern the adjustment work must be repeated.

These disadvantages have been eliminated by the wood shaping machine according to the present invention. The main feature of the invention is to provide means whereby the work supporting table of the machine is adapted, by means of a screw spindle carrying a hand wheel with a scale, to be horizontally moved in relation to the cutter spindle, and to be locked in its adjusted position.

Another feature of the invention consists in that in the opening provided in the table for the cutter spindle there is removably inserted a guiding collar provided with a springy, bow-shaped guide member projecting above the surface of the table and partly embracing the cutter spindle. This guide member at its middle point is fixedly connected with the guide collar and at its ends the guide member is connected with the machine frame by means of links in such a manner, that the guide member upon movement of the table in relation to the machine frame and the cutter spindle is accurately adjusted with respect to the cutter spindle and the cutter blades. By this arrangement it is possible to change the milling depth without having to make any adjustment to the position of the cutter blades or to the exact size of the workpiece when milling with a pattern.

The guide collars hitherto used are not provided. The wood splinters during the milling operation, often rebound over the surface of the table and enter between the pattern and the guide collar, so that the cut edge will be rough. This disadvantage is eliminated by the present invention in that the said guide member on its outer side at the lower edge is provided with a split groove in the shape of a recess extending over at least the greater part of the length of the guide member and the guide collar adjacent to the said recess is also provided with a corresponding groove.

On cutting with the use of stop bars or tenon cutting apparatus the guide collar is replaced by a supplement disc provided with a slot for the cutter spindle which slot is parallel with the direction of movement of the table. Thus, by movement of the working table according to the present invention both the stop bars can be adjusted by a single manual operation.

The invention will now be described with reference to the accompanying drawings in which:

Figure 1 shows in side view a wood shaping machine in accordance with the present invention;

Figure 2 is a part end elevation of the machine and a part shown in section on the line II—II of Figure 3;

Figure 3 is a plan of the machine;

Figure 4 is a plan view of the guide collar on an enlarged scale;

Figure 5 is a plane view of the underside of the guide collar with its protection plate removed;

Figure 6 is a vertical section on the line VI—VI of Figure 5 of the guide collar and the adjacent parts of the table and machine frame;

Figure 7 is a schematic illustration of three different positions of the guide member in relation to the cutter spindle.

Figure 8 is a plane view of the machine in which the guide collar is replaced by a supplement disc.

The wood shaping machine has a fixed frame 1, which at the upper end is provided with horizontal beams 2, the upper edges 3 of which form a dovetailed guide for the work supporting table 4, which can be moved horizontally upon the frame 1. The table 4 is provided with a depending bracket 5 (Figure 1), in which is threaded a screw spindle 6. The screw spindle 6 at its inner end is pivotally connected to a projection 10 of the frame 1, which projection 10 is provided with a locking screw 11 and at the opposite end the spindle 6 carries a hand-wheel 7. The hand-wheel 7 is provided with a scale, and corresponding to the same an index 8 is mounted on the machine frame 1, for the control and adjustment of the hand-wheel 7.

At the centre the table 4 is provided with a circular opening for a guide collar with an opening for the cutter spindle 9. By this arrangement it is possible to move the table in relation to the cutter spindle 9. By means of the locking screw 11 and the spindle 6 the table 4 can be locked in the adjusted position.

At one side the machine is provided with a hand-wheel 12 for the vertical movement and adjustment of the cutter spindle 9.

The table 4 is provided on each side of the cutter spindle 9 in known manner with two parallel dovetailed guides 13 for two stop bars (not shown in the drawing).

In the embodiment shown in Figures 1–7 a circular guide collar 14 is inserted in the circular opening in the table 4. The upper surface of the guide collar 14 is level with the surface of the table 4. The guide collar 14 at its centre is provided with an elliptically shaped opening 15 for the cutter spindle the main axis of which opening is at right angles to the direction of movement of the table 4. To the lower edge of the opening 15 is fastened a flange 16 of a similar shape as the opening 15, which flange supports a connection piece 17 which carries a bowshaped guide member midway between its ends, which guide member projects vertically through the opening 15 and above the level of the table 4. The guide member 18 partly embraces the cutter spindle 9 and has tapering ends and is made so that it is springy and may flex.

Diametrically opposite the connection piece 17 the guide collar 14 is provided on the underside with a radial guide 19 for a slide 20 which moves relatively to the table in the direction of movement of the table 4. The slide 20 on the underside has a depending cylindrical pin 21, which engages in a vertical boring 36 in the machine frame and so holds the slide 20 stationary when the table 4 moves. At the inner end the slide 20 is provided with a second pin 22. Pivoted to the pin 22 are two short links 23 each of which by means of a pivot pin 24 is connected with the ends of two bow-shaped links 25 embracing the cutter spindle 9. At their opposite, wider ends the bows 25 are connected with each other by means of a pin 26. Each bow 25 is further provided with a guide slot 27 for a pin 28 arranged on a link 29. The links 29 pass through openings 39 in the flange 16 and by means of pins 30 are pivotally connected with the corresponding ends of the guide member 18.

By means of the link system it is possible exactly to adjust the guide member 18 in relation to the cutter spindle 9 by movement of the table 4 in relation to the spindle, since the slide 20, as previously stated, does not accompany the table in the movement. The length of movement of the slide 20 in the guide 19 in relation to the table 4 in the embodiment shown in the drawing is about 10 millimeters. The guide member 18 is shown in its zero or mid-position, and thus the workpiece 31, by adjustment of the guide member, can be made 5 mm. bigger or smaller. The guide 19 also serves as a stop for the guide member 18, so that the same cannot come in contact with the gripping jaw 32 for the cutter blades 35.

In Figure 7 different positions of guide member 18 are schematically illustrated. The position indicated with full lines is the zero position of the guide member in relation to the cutter spindle 9, and the outer and inner limit positions are indicated with dotted and chain lines respectively.

On its outer side at the lower edge the guide member 18 is provided with a recess 33 extending over at least the greater part of the length, which recess serves as a splinter groove in order to prevent splinters from the workpiece 31 entering between the pattern 34 and the guide member 18. The guide collar 14 adjacent to the said recess is provided with a corresponding groove (Figure 6).

The guide collar 14 at the underside is provided with a protection plate (not shown in the drawing) with an opening for the cutter spindle 9 and the pin 21.

According to Figure 8 the guide collar is replaced by a supplement disc 37 provided with a slot 38 for the cutter spindle, which slot is in parallel with the direction of movement of the table and lying on the diameter of the disc. This device is used on shaping with the use of stop bars or tenon cutting apparatus, in which the disc 37 together with the table 4 is moved in relation to the cutter spindle 9. The stop bars mounted on the table by this arrangement can be simultaneously adjusted by the movement of the table 4, and by a single manual operation they can be brought in any desired position in relation to the cutter spindle 9. In groove cutting work, where the stop bars must be in line with each other, this device is very time-saving, since both stop bars are adjusted simultaneously to the same amount.

What I claim is:

1. A wood shaping machine including a frame, a work supporting table carried by said frame, a vertical cutter spindle, an opening in the work table for the cutter spindle, a guide collar removably carried in said opening, a springy flexible bow-shaped guide member carried at its mid-point by the guide collar and supported above the level of the work supporting table and partially surrounding the cutter spindle, link mechanism connecting the ends of the guide member to the machine frame, a screw spindle carried by the frame and engaging the work supporting table, and a hand wheel on the spindle, operation of the hand wheel serving to move the work supporting table horizontally in relation to the cutter spindle, so that the link mechanism adjusts the guide member accurately in relation to the cutter spindle and the cutting blades for accurate milling depth and size of workpiece.

2. A wood shaping machine as claimed in claim 1 wherein the link mechanism connecting the guide member to the machine frame includes a radial guide to the guide collar extending in the direction of movement of the table, a slide in said radial guide detachably connected to the machine frame so as to be held stationary by said machine frame when the table is moved, a pair of short links connected to the slide on either side, a pair of bow shaped links embracing the cutter spindle and each connected at one end to one of the said short links and at the other to each other at a point diametrically opposite to the slide in relation to the cutter spindle, and a further pair of links each pivotally connected at one end to one end of the guide member, and at the other connected by a pin and slot connection to one of the bow shaped links.

3. A wood shaping machine as claimed in claim 1 wherein the guide member tapers from the centre to each end.

4. A wood shaping machine as claimed in claim 1 in which the guide member is provided with a groove extending over at least the greater part of its length and the guide collar has a similar and matching groove to form a space where splinters may enter without entering between the guide member and the pattern.

MARTIN MÅRTENSSON.

REFERENCES CITED

The following references are of record in the file of this patent:

UNITED STATES PATENTS

| Number | Name | Date |
|---|---|---|
| 1,054,073 | Zimmermann | Feb. 25, 1913 |
| 1,615,893 | Wagner | Feb. 1, 1927 |